(12) United States Patent
Yao et al.

(10) Patent No.: US 10,677,682 B2
(45) Date of Patent: Jun. 9, 2020

(54) SYSTEMS AND METHODS FOR MONITORING PLASTIC DEFORMATION OF A STRUCTURED MATERIAL

(71) Applicant: AGENCY FOR SCIENCE, TECHNOLOGY AND RESEARCH, Singapore (SG)

(72) Inventors: Kui Yao, Singapore (SG); Shifeng Guo, Singapore (SG); Shuting Chen, Singapore (SG); Lei Zhang, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/487,913

(22) PCT Filed: Feb. 23, 2018

(86) PCT No.: PCT/SG2018/050085
§ 371 (c)(1),
(2) Date: Aug. 22, 2019

(87) PCT Pub. No.: WO2018/156084
PCT Pub. Date: Aug. 30, 2018

(65) Prior Publication Data
US 2019/0383695 A1    Dec. 19, 2019

(30) Foreign Application Priority Data
Feb. 23, 2017   (SG) ................... 10201701466W

(51) Int. Cl.
*G01L 1/16* (2006.01)
*G01M 5/00* (2006.01)
(Continued)

(52) U.S. Cl.
CPC ........... *G01M 5/0066* (2013.01); *G01B 17/04* (2013.01); *G01L 1/16* (2013.01); *G01N 29/043* (2013.01);
(Continued)

(58) Field of Classification Search
CPC ........ G01L 1/16; G01M 5/0066; G01B 17/04; G01N 29/043
(Continued)

(56) References Cited

U.S. PATENT DOCUMENTS

| | | | |
|---|---|---|---|
| 3,948,089 A * | 4/1976 | Shaw ..................... | G01L 1/16 73/776 |
| 2008/0289420 A1 * | 11/2008 | Cochran ............. | C23C 14/0617 73/596 |
| 2015/0070227 A1 | 3/2015 | Kishino et al. | |

FOREIGN PATENT DOCUMENTS

| CN | 102621227 A | 8/2012 |
|---|---|---|
| WO | WO-2016/089310 A1 | 6/2016 |

OTHER PUBLICATIONS

Lingyu (Lucy) Yu, "In-situ Structural Health Monitoring With Piezoelectric Wafer Active Sensor Guided-Wave Phased Arrays", Submitted in Partial Fulfillment of the Requirements for the Degree of Doctor of Philosophy in the Department of Mechanical Engineering College of Engineering and Information Technology University of South Carolina, 2006, 359 pages http://www.me.sc.edu/research/lamss/pdf/Dissertations/Lucy_YU_PhD_Dissertation/pdf, pp. 2, 4, 13-17, 35, 55-57, 63, 64, 129; Figures 2, 23.
(Continued)

*Primary Examiner* — Jamel E Williams
(74) *Attorney, Agent, or Firm* — Marshall, Gerstein & Borun LLP

(57) ABSTRACT

Systems and methods for monitoring plastic deformation of a structural material are provided. An acoustic wave actuator is configured to generate acoustic wave signals to be propa-
(Continued)

gated within the structural material and is in-situ fabricated on the structural material at a first location. An alternating current (AC) electric signal source drives the acoustic wave actuator to generate the acoustic wave signals at a predetermined frequency. One or more acoustic wave sensors detect the acoustic wave signals generated by the acoustic wave actuator and propagated within the structural material. More particularly, the acoustic wave detectors are configured to detect both fundamental and second harmonic acoustic signals at the predetermined frequency. The acoustic wave sensors are in-situ fabricated on the structural material at one or more second locations.

20 Claims, 11 Drawing Sheets
(8 of 11 Drawing Sheet(s) Filed in Color)

(51) Int. Cl.
  *G01B 17/04* (2006.01)
  *G01N 29/04* (2006.01)
  *G01N 29/44* (2006.01)

(52) U.S. Cl.
  CPC . *G01N 29/4454* (2013.01); *G01N 2291/0258* (2013.01); *G01N 2291/02491* (2013.01)

(58) Field of Classification Search
  USPC .................................................. 73/862.68
  See application file for complete search history.

(56) References Cited

OTHER PUBLICATIONS

Guo et al., "Plastic Strain Determination With Nonlinear Ultrasonic Waves Using In Situ Integrated Piezoelectric Ultrasonic Transducers", IEEE Transactions on Ultrasonics, Ferroelectrics, and Frequency Control, vol. 65, No. 1, Jan. 2018, pp. 95-101.
Search Report and Written Opinion in International Application No. PCT/SG2018/050085 dated May 16, 2018, 12 pages.

* cited by examiner

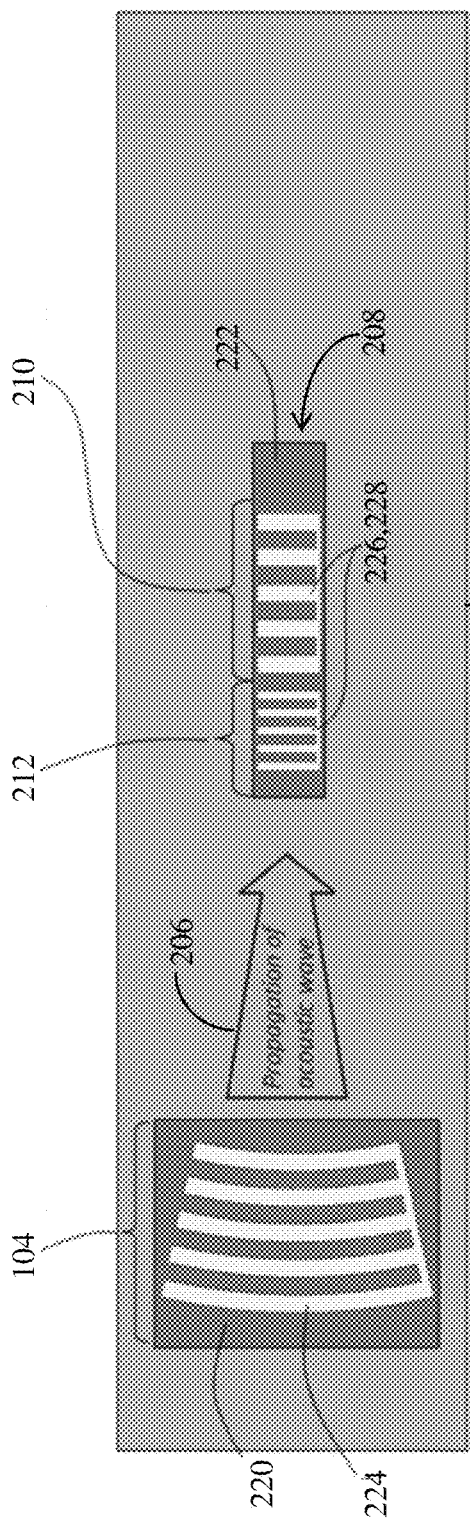
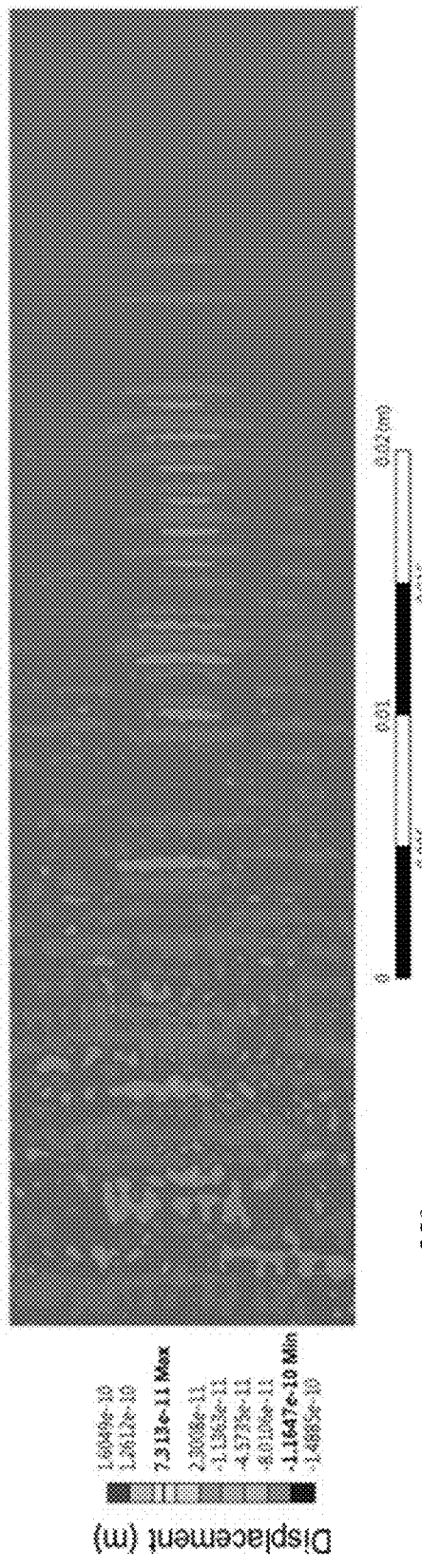
FIG. 3A
FIG. 3B

SYSTEMS AND METHODS FOR MONITORING PLASTIC DEFORMATION OF A STRUCTURED MATERIAL

PRIORITY CLAIM

This application claims priority from Singapore Patent Application No. 10201701466W filed on 23 Feb. 2017.

TECHNICAL FIELD

The present invention generally relates to acoustic transducers used for structural health monitoring, and more particularly relates to methods and apparati for monitoring plastic deformation in a structured material.

BACKGROUND OF THE DISCLOSURE

A reliable non-destructive plastic deformation monitoring method is crucial for assuring safety and reliability of structural materials and mechanical structures. Plastic deformation can sometimes be determined by measuring dimension changes, but such methods are not an effective monitoring method for many practical applications due to production tolerance in size, localization of the plastic strain, and complex shapes of the plastic to be monitored.

Plastic deformation in an area produces high order harmonics in the acoustic signal propagated. Thus, high order harmonic acoustic signals as a nonlinearity parameter change to determine an extent of plastic deformation of a structural material has been proposed. Increase in the acoustic nonlinearity parameter is due to nonlinear stress-strain relation in the material produced by plasticity-induced microstructure changes.

Methods of nonlinear acoustic testing with discrete acoustic transducers has been proposed for studying plastic deformation and, while the correlation of nonlinearity parameter with the plastic deformation has been observed, there is a lack of an effective method to monitor plastic deformation in practical applications.

High order nonlinear acoustic signals are typically very small; they also exist in structural material without plastic deformation. Conventional bulky discrete acoustic transducers are fixed and positioned manually to measure the high order non-linear acoustic signals on the structural material to be monitored. Any variation in the pressure to fix the transducers or in the positioning or alignment of the discrete transducers significantly affects the measurements of the small harmonic signals.

In addition, for measuring Rayleigh or Lamb acoustic waves, bulky discrete acoustic transducers need be used together with wedges to convert the external transducers' vibration to a desired acoustic wave in the structural material. Conventionally, the wedges are manually fixed on the structural material, giving arise to many problematic factors having significant effect on monitoring of the plastic deformation such as positioning, alignment and type of the wedge. Moreover, acoustic coupling gel agent is typically required to be applied between the discrete transducer (or the wedge) and the structural material to facilitate transmitting acoustic waves. The amount and homogeneity of the coupling agent will also affect the testing results as even an extremely thin air gap at the transducer/material interface has significant detrimental effect on acoustic energy transmission. It is also challenging to use discrete transducers with structural material having curved shapes or limited space.

These issues with conventional plastic deformation monitoring method make it difficult to obtain repeatable or comparable high order harmonic acoustic signal reception, further acerbated by the fact that such high order harmonic acoustic signals are typically a few orders of magnitude smaller than fundamental signals.

Thus, what is needed are methods and systems for monitoring plastic deformation that are based on high order harmonic, such as second order signal variations, which provide reliable and consistent results despite service time or stress loading. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a system for monitoring plastic deformation of a structural material is provided. The system includes the structured material, an acoustic wave actuator, an electric signal source and an acoustic wave sensor. The acoustic wave actuator is configured to generate acoustic wave signals to be propagated within the structural material and is in-situ fabricated on the structural material at a first location. The alternating current (AC) electric signal source is coupleable to the acoustic wave actuator for driving the acoustic wave actuator to generate the acoustic wave signals at a predetermined frequency. The acoustic wave sensor detects the non-linear acoustic wave signals generated by the plastic deformation of the structural material in the propagation path. More particularly, there are two acoustic wave sensors, configured to detect the fundamental and second harmonic ultrasonic signals at the predetermined frequency, respectively, to determine acoustic non-linearity. At least one of the acoustic wave actuator and the acoustic wave sensors is in-situ fabricated on the structural material at either the first location or one of the one or more second locations, respectively.

According to another aspect of the present embodiments, a method for monitoring plastic deformation of a structural material is provided. The method includes providing the structural material having an acoustic wave actuator at a first location on the structural material, the acoustic wave actuator configured to generate acoustic wave signals to be propagated within the structural material. The method also includes providing an alternating current (AC) electric signal source to the acoustic wave actuator for driving the acoustic wave actuator to generate the acoustic wave signals at a predetermined frequency and detecting both fundamental and second harmonic ultrasonic signals. And, finally, the method includes analyzing both the fundamental and the second order harmonic acoustic signals at the predetermined frequency, respectively, to determine acoustic non-linearity and to monitor plastic deformation of the structural material.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 3, comprising FIGS. 3A and 3B, depicts a further view of the system for plastic deformation monitoring of FIG. 2 in accordance with the first variation of the present embodiments wherein FIG. 3A depicts a top planar view of the system for plastic deformation monitoring of FIG. 2 and FIG. 3B depicts simulation results of surface displacement of the monitored structural material caused by acoustic waves for monitoring for plastic deformation.

Figure 1:
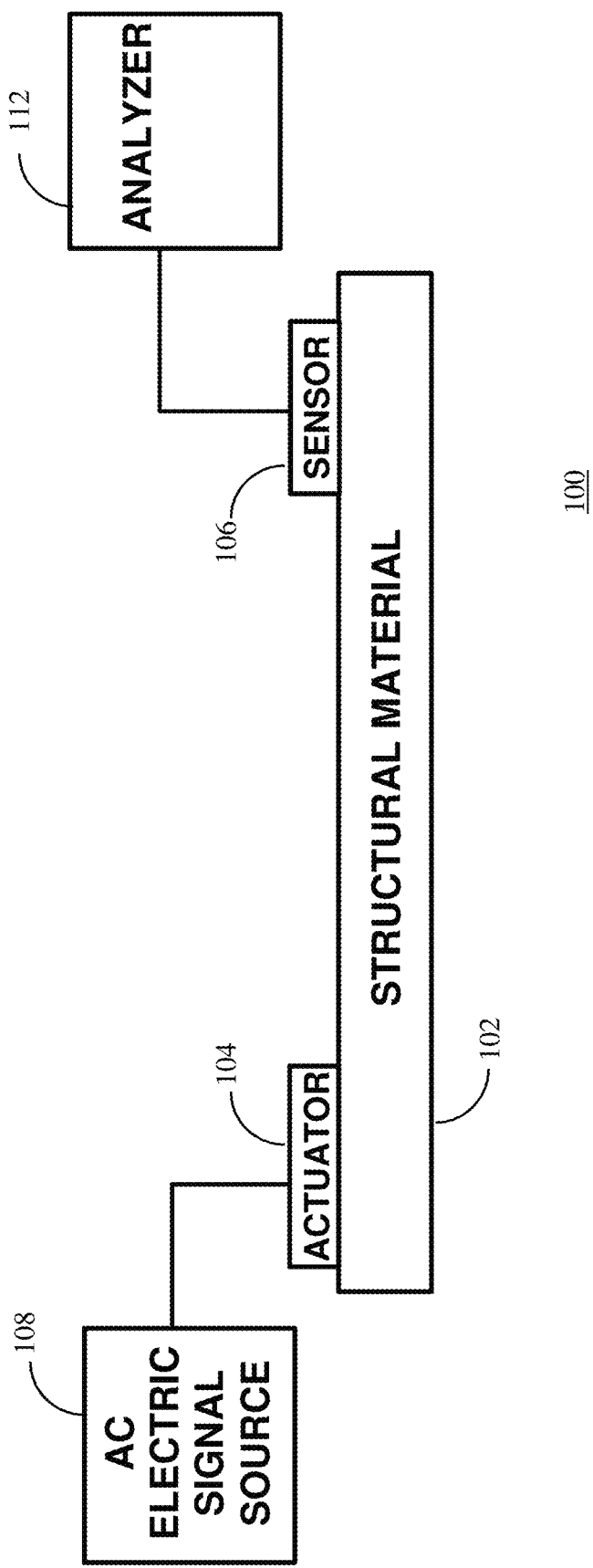
FIG. 1 depicts a side planar overview of systems for monitoring plastic deformation in a structural material in accordance with present embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present unique systems and methods for monitoring plastic deformation of a structural material by analyzing nonlinear acoustic wave signals, wherein the acoustic wave signals are generated and detected by acoustic transducers (including the actuators and sensors) formed by in-situ fabrication directly onto the structural material. Improved nonlinear acoustic measurement consistency and reliability and larger high order harmonic to fundamental acoustic signal ratio can be realized by the systems and methods in accordance with present embodiments described herein. In addition, reduced labor and installation cost can be realized and the systems and methods in accordance with present embodiments are able to be seamlessly integrated to structure materials with curved shapes or limited space.

Plastic deformation, which is opposite to elastic deformation, refers to a permanent deformation in a structural material under a mechanical stress or once subjected to a mechanical stress that exceeds the yield strength of the material. Structural material here refers to any materials which are under a mechanical loading or once underwent a mechanical loading and can include metallic materials, (e.g., aluminum, titanium, steel, and various alloys), ceramics, polymers or composites.

Non-linear acoustic wave signals herein refer to acoustic signals with high order harmonics such as second order or higher and can include a surface acoustic wave, such as a Rayleigh wave or a bulk wave, such as a Lamb wave, generated and detected by acoustic transducers formed by in-situ fabrication method on the structural material. In-situ fabrication refers to a direct write process in which the materials and electrodes of the acoustic transducers are formed of materials (e.g., piezoelectric materials and electrode materials) directly deposited and patterned on the structural material to produce the acoustic transducer (e.g., at the first and second locations) to cover areas to be monitored between the first and second locations through which the non-linear acoustic wave signals propagate.

Acoustic transducers include actuators able to generate acoustic wave signals and acoustic sensors (or detectors) for detecting the acoustic wave signals. In accordance with the present embodiments, the acoustic sensors are designed to detect both fundamental and high order harmonics of the acoustic wave signals. The acoustic wave signals propagate through the structural material under monitoring and carry information about the plastic deformation of the structural material. The fundamental and high order harmonic signals of the acoustic wave signals propagated through the structural material detected by the acoustic sensors (detectors) are analyzed to determine occurrence and extent of plastic deformation of the structural material. Methods for monitoring plastic deformation in the structured material may involve using multiple acoustic transducers or a transducer network formed by in-situ fabrication method directly on the structural material. Other means can be used for detecting the acoustic waves, such as discrete transducers or laser beams, but at least one acoustic transducer in-situ fabricated on the structural material is involved.

Each in-situ fabricated acoustic transducer includes piezoelectric material as the acoustic active material, electrodes and an optional protection layer. For non-conductive structural material or where there is an insulation coating on a conductive structural material, a conductive layer can be coated on the structural material as a bottom electrode. The conductive layer may be metal (e.g., gold, aluminum, silver), other conductive inorganic material (e.g., carbon nanotubes), or conductive organic materials (e.g., poly(3,4-ethylenedioxythiophene) or polystyrene sulfonate). For conductive structural material, the conductive structural material can serve as the bottom electrode, such that the deposition and patterning of a bottom electrode becomes optional.

The piezoelectric materials include, but are not limited to, poly(vinylidene fluoride) (PVDF) homopolymer, poly (vinylidenefluoride/trifluoroethylene) copolymer (P(VDF/TrFE)), or piezoelectric ceramic. The electrodes and piezoelectric materials may be deposited on the structural material by methods such as aerosol spraying, screen-printing, inkjet printing, or sputtering. The optional top protection layer may be deposited directly on top of the electrodes. The optional protection layer may be made of polyimide (PI) or poly (methyl methacrylate) (PMMA).

Referring to FIG. 1, a side planar view 100 depicts an overview of systems for monitoring plastic deformation in a structural material in accordance with present embodiments. The systems for monitoring plastic deformation in accordance with the present embodiments include a structural material 102, an acoustic wave actuator 104 and acoustic wave sensors/detectors 106. The acoustic wave actuator 104 is configured to generate acoustic wave signals to be propagated within the structural material 102. In accordance with the present embodiments, the acoustic wave actuator 104 is in-situ fabricated on the structural material 102 at a first location. The acoustic wave sensors/detectors 106 detect the acoustic wave signals generated by the actuator and propagated within the structural material 102. In accordance with the present embodiments, the acoustic wave sensors/detectors 106 are configured to detect both fundamental and second order harmonic acoustic signals at the predetermined frequency. In addition, in accordance with the present embodiments, when the acoustic wave sensors/detectors 106 are piezoelectric transducers with electrodes for detecting the fundamental and high order harmonics of the acoustic wave signals, they are in-situ fabricated on the structural material 102 at one or more second locations.

An alternating current (AC) electric signal source 108 can be coupled to the acoustic wave actuator 104 for driving the acoustic wave actuator 104 to generate the acoustic wave signals at a predetermined frequency. When put into service, plastic deformation of the structural material 102 is monitored in accordance with present embodiments and as mechanical loading applies pressure to the structural material 102, an analyzer 112 coupled to the acoustic wave sensors/detectors 106 analyze both the fundamental and second harmonic acoustic signals to determine plastic deformation of the structural material.

Example 1

Figure 2:
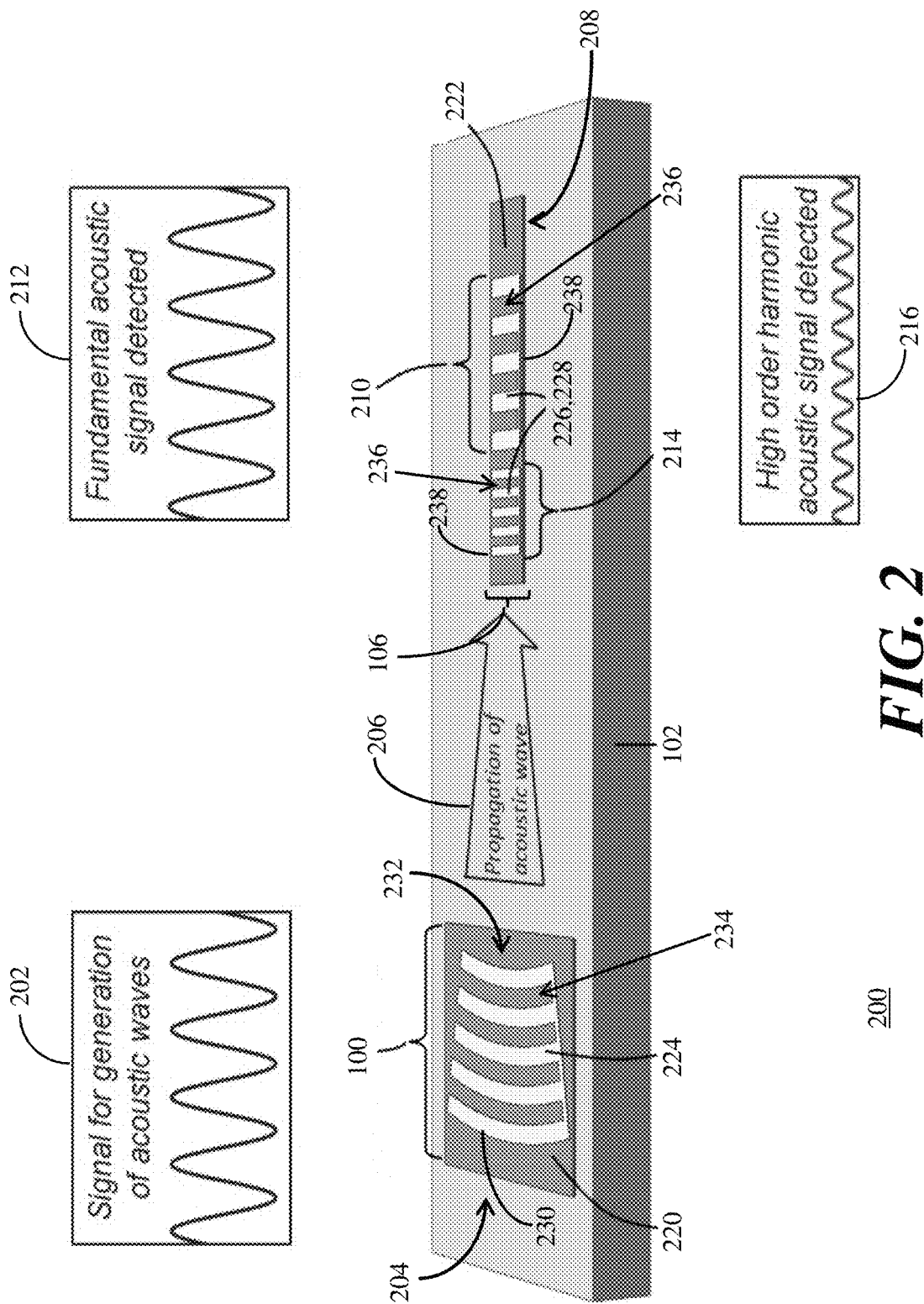
FIG. 2 depicts a perspective view of a system for plastic deformation monitoring in accordance with a first variation of present embodiments.

Referring to FIG. 2, a perspective view 200 of a system for plastic deformation monitoring in accordance with a first variation of present embodiments is depicted. The plastic deformation of the structural material 102 is monitored by analyzing acoustic wave signals generated by the transducer (actuator) 104 driven by electrical driving signal 202 and detected by acoustic transducers (sensors) 106 formed by in-situ fabrication method on the structural material 102. The acoustic transducers comprise one transducer 104 at a first location 204 acting as an actuator to generate the acoustic wave signal to propagate through the structural material 102 in at least a direction indicated by an arrow 206, and transducers 106 at a second location 208 acting as sensors/detectors and having a first portion or sensor 210 to detect a fundamental signal 212 of the acoustic wave signal 202 and a second portion or sensor 214 to detect high order harmonic signal 216.

The acoustic transducers 104, 106 are made of piezoelectric material 220, 222 such as a layer of a piezoelectric polymer such as poly(vinylidene fluoride) homopolymer (PVDF), poly (vinylidenefluoride/trifluoroethylene) copolymer (P(VDF/TrFE)), or piezoelectric ceramic, and a layer of comb patterned electrode 224, 226, 228, such as gold, both of which are directly deposited and patterned on the structural material 102 by methods such as aerosol spraying, evaporation or printing. The piezoelectric material 220, 222 are in-situ formed on the structural material 102 rather than attached or installed and then poled by an electric field applied from a DC power supply or corona discharge prior to the plastic deformation monitoring.

The electric signal 202 is used to generate the acoustic wave signals by the acoustic wave transducer 104 having a concentric arced comb patterned electrode 224, and detected by two acoustic transducer sensor portions 210, 214. The comb electrode 224 comprises concentric arced fingers 230 having an open area 232 of the arc of concentric arced fingers 230 faces towards the second location 208 for focusing the non-linear acoustic signals 202 on the acoustic wave sensor/detector 106. Gaps 234 between the central lines of two adjacent electrode comb fingers 230 of the acoustic wave actuator 104 correspond to a wavelength of the fundamental acoustic wave to be generated. Gaps 236 between central lines of two adjacent electrode comb fingers 238 of the two sensors 210, 214 correspond to the wavelength of the fundamental acoustic signal 212 and the high order harmonic acoustic wave signal 216 (e.g., a $2^{nd}$ order harmonic acoustic signal), respectively.

Acoustic waves are generated in the structural material 102 by driving the actuator 104 by an AC electric signal from the AC electrical signal source 108 (FIG. 1) at a predetermined frequency of f. The fundamental signal (having a magnitude of $A_1$) at a frequency of f and a high order harmonic signal (having a magnitude of $A_n$) at frequency of n×f, where n is an integer, are detected by the corresponding sensors 210, 214. In accordance with the present embodiments, it is not required that the in-situ formed transducers 104, 106 be located in a region with an occurrence of plastic deformation, as long as the acoustic wave signals pass through the location of the plastic deformation. As an example, for the $2^{nd}$ order harmonic signal, $A_2/A_1^2$ parameter is used as an indicator for monitoring the plastic deformation of the structural material.

In accordance with one exemplary method, the $A_2/A_1^2$ parameter of the structural material 102 without plastic deformation is measured and recorded as a baseline. Then mechanical stress loading is applied on the structural material 102 by the stress loading means 110 and the $A_2/A_1^2$ parameter is measured to monitor the extent of plastic deformation of the structural material 102.

Finite element numerical simulations have been conducted to study the acoustic wave 202 generated by the acoustic transducer 104 with the concentric arced comb electrode 224. FIG. 3, comprising FIGS. 3A and 3B, depicts a further view 300 of the system for plastic deformation monitoring depicted in the view 200 in accordance with the first variation of the present embodiments. FIG. 3A depicts the top planar view 300 of the system for plastic deformation monitoring depicted in the view 200 and FIG. 3B depicts simulation results 350 of surface displacement of the monitored structural material 102 caused by acoustic waves for monitoring for plastic deformation. As shown in FIG. 3A, the acoustic wave is focused towards the second location 208 where the two sensors 210, 212 are located as indicated by the arrow 206. This focus significantly increases the intensity of the acoustic wave to be detected in accordance with present methods, and thus enhances the sensitivity of plastic deformation monitoring in accordance with the present embodiments.

As indicated above, the $A_2/A_1^2$ parameter of a structural material 102 without plastic deformation is measured and recorded as a baseline. Then the $A_2/A_1^2$ parameters of another identical structural material 102 with an unknown extent of plastic deformation is measured by the same method (i.e., the same transducer design, electrical signal for generation of acoustic waves, and other parameters are the same). The extent of plastic deformation of the latter structural material can be determined by comparing the $A_2/A_1^2$ parameters with the baseline to measure surface displacement of the structural material 102 as shown in the simulation results 350. A variation of this method in accordance with present embodiments compares the $A_2/A_1^2$ parameters from a plurality of transducers 106 in-situ formed at a plurality of second locations of a structural material 102, the plurality of second locations including locations subjected to and not subjected to a large loading from one or more stress loading means 110 for determining the plastic deformation of the structural material 102.

Example 2

Figure 4:
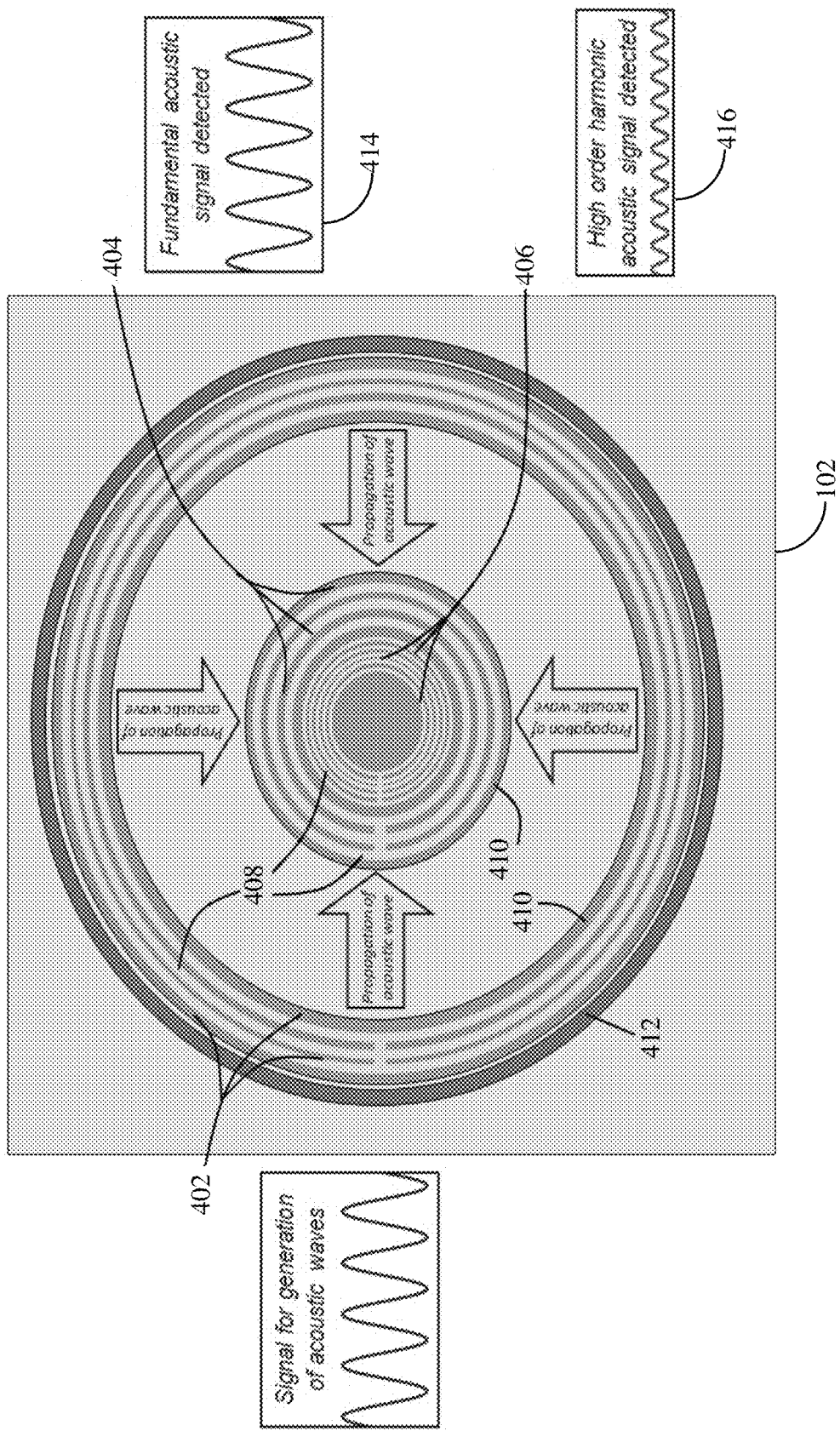
FIG. 4 depicts a top planar view of a system for plastic deformation monitoring in accordance with a second variation of the present embodiments.

Referring to FIG. 4, a top planar view 400 of a system for plastic deformation monitoring in accordance with a second variation of the present embodiments is depicted. The system depicted in the view 400 differs from that depicted in the views 200, 300 in that the acoustic transducers 402 for acoustic wave generation and the acoustic transducers 404, 406 for acoustic wave detection have concentric circular electrodes 408 on top of piezoelectric layers 410, both formed by in-situ fabrication directly written onto the structural material 102. In accordance with the second variation of the present embodiments, a reflector 412 is formed on the structural material.

The acoustic waves generated by the circular actuator 402 are focused towards a center area of the concentric circular electrode 402 and are detected by the two sensors 404, 406 at the of the concentric circular electrode 402, the first sensor 404 for detecting the fundamental acoustic signals 414 and the second sensor 406 for detecting the $2^{nd}$ harmonic acoustic signals 416. The acoustic reflector 412, such as a metallic line pattern, is also fabricated on the structural material 102, preferably by in-situ fabrication, in order to form resonance within the center area of the concentric circular electrode 402 to enhance the $2^{nd}$ order harmonic signal 416, thereby improving the sensitivity of the system depicted in the view 400.

Example 3

Figure 5:
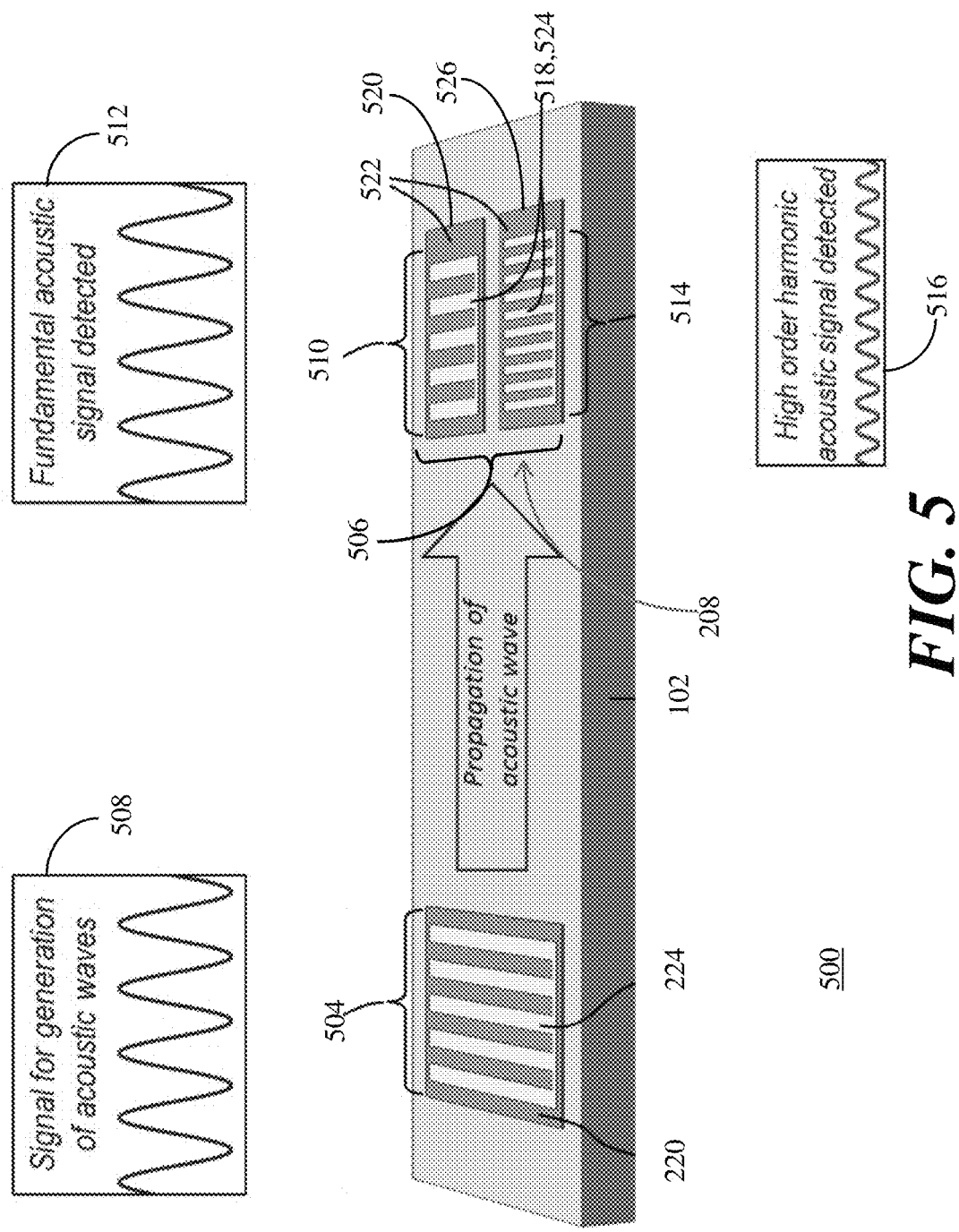
FIG. 5 depicts a perspective view of a system for plastic deformation monitoring in accordance with a third variation of the present embodiments.

Referring to FIG. 5, a perspective view 500 depicts a system for plastic deformation monitoring in accordance with a third variation (Example 3) of the present embodiments. The system depicted in the view 500 differs from that depicted in the views 200, 300 in that the acoustic transducer 504 driven by the electric signal 508 for generation of the acoustic wave signals and the acoustic transducers 510, 514 for detection of the fundamental acoustic signals 512 and the high order harmonic acoustic signals 516, respectively, each have a comb electrode with straight fingers formed by in-situ fabrication method on the structural material 102.

Moreover, the system depicted in the view 500 differs from that depicted in the views 200, 300 in that the acoustic transducer 510 includes a first electrode 518 patterned on a first portion 520 of the piezoelectric material 522 at the second location 208 and a second electrode 524 patterned on a second portion 526 of the piezoelectric material 522 co-located with the first portion 520 at the second location 208 but not integrally formed with the first portion 520 of the piezoelectric material 522.

Example 4

Figure 6:
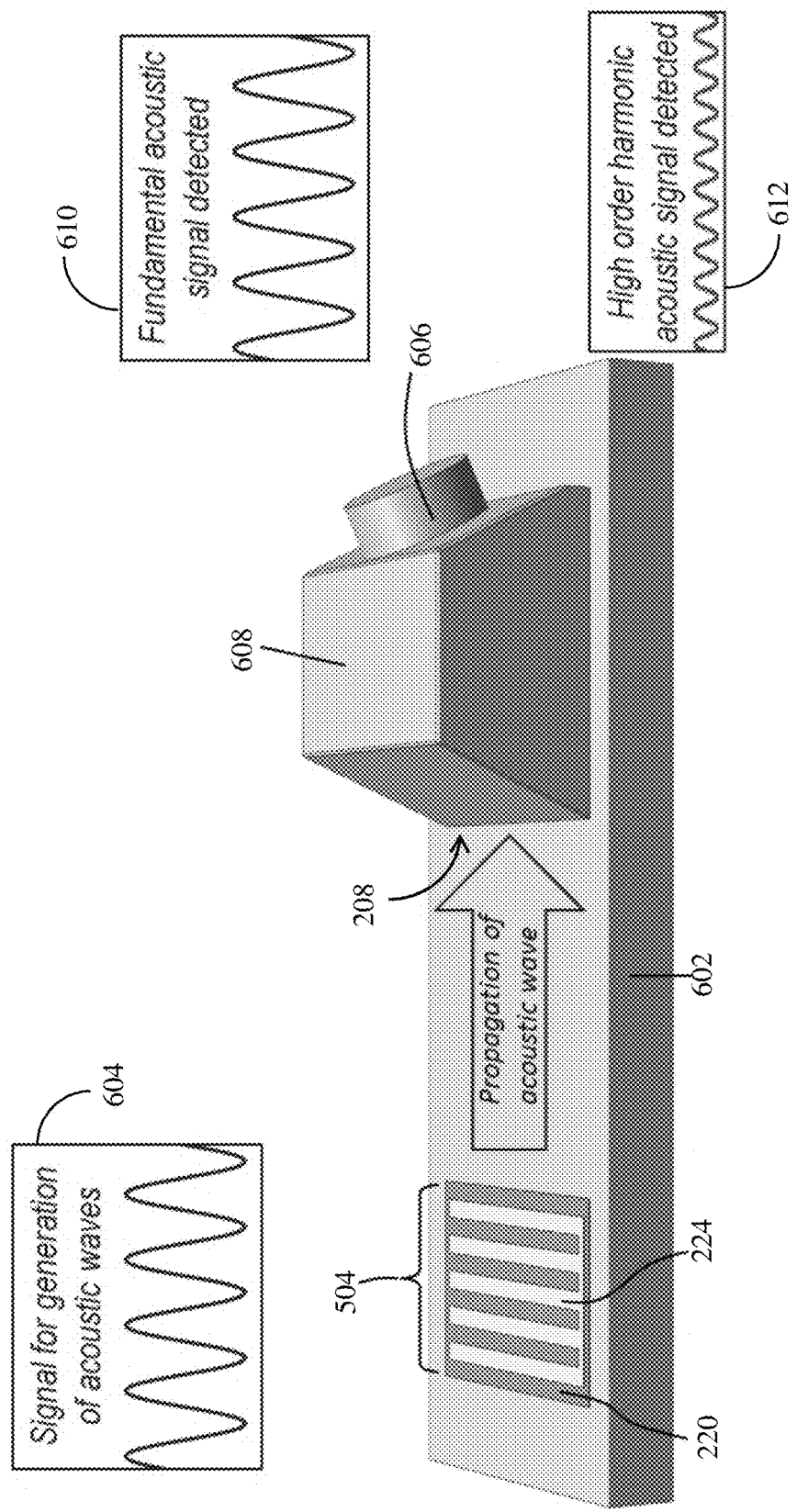
FIG. 6 depicts a perspective view of a system for plastic deformation monitoring in accordance with a fourth variation of the present embodiments.

Referring to FIG. 6, a perspective view 600 depicts a system for plastic deformation monitoring in accordance with a fourth variation (Example 4) of the present embodiments. The system depicted in the view 600 differs from that depicted in the views 200, 300 in that the plastic deformation of a titanium alloy plate 602 was evaluated by analyzing Rayleigh wave signals generated by the acoustic transducer (actuator) 504 with the electric signal 604, wherein the the acoustic transducer (actuator) 504 formed by in-situ fabrication directly on the titanium alloy plate 602 and detected by two discrete angle beam transducers 606 with wedges 608, the transducers 606 and the wedges 608 are assembled on the titanium alloy plate 602.

Test monitoring of plastic deformation of the titanium alloy plate 602 was performed using a method for monitoring plastic deformation of a structural material in accordance with present embodiments. Titanium alloy plates 602 were cut according to the dimensions in the ASTM E8-04 standard of tensile testing. Two titanium alloy plates 602 were loaded in a tensile machine and elongated to a strain level of 1.2% and 5.7%. After tensile elongation, the plastic deformation level (i.e., the plastic strain level) of the two titanium alloy plates 602 was 0.9% and 5.1%, respectively.

Acoustic transducer (actuator) 504, comprising piezoelectric P(VDF/TrFE) films and electrodes in comb pattern were formed on the two plates 602 with plastic deformation level of 0.9% and 5.1% and another plate 602 without plastic deformation to generate the acoustic wave. Angle beam transducers 606 with wedges 608 were used as other transducers (sensors) to detect the acoustic wave.

The P(VDF/TrFE) films were in-situ formed by aerosol spraying of P(VDF/TrFE) solution followed by thermal treatment and patterned on the titanium alloy plates 602 with aid of a shadow mask.

The electrodes were then in-situ formed and patterned on the P(VDF/TrFE) films by evaporation followed by wet etching. The gap between the central lines of two adjacent electrode comb fingers of the actuator 504 is 657 μm, which corresponds to a wavelength of the Rayleigh wave of 4.5 MHz. The fundamental signal (i.e., 4.5 MHz) 610 and the $2^{nd}$ order harmonic signal (i.e. 9.0 MHz) 612 were detected by two discrete angle beam transducers 606. The distance between the acoustic transducer 504 and the angle beam transducer 606 was 25 mm.

During testing, the acoustic transducer 504 was actuated by a 4.5 MHz tone burst signal with 100 cycles at an amplitude of 150 V. The fundamental acoustic signal ($A_1$) was collected by the angle beam transducer 606 with a central frequency of 5 MHz, and the $2^{nd}$ harmonic signal ($A_2$) was collected by the angle beam transducer 606 with a central frequency of 10 MHz, both located at the second location 208. The ratio of $A_2/A_1^2$ was then used as a parameter to evaluate the extent of plastic deformation.

Figure 7:
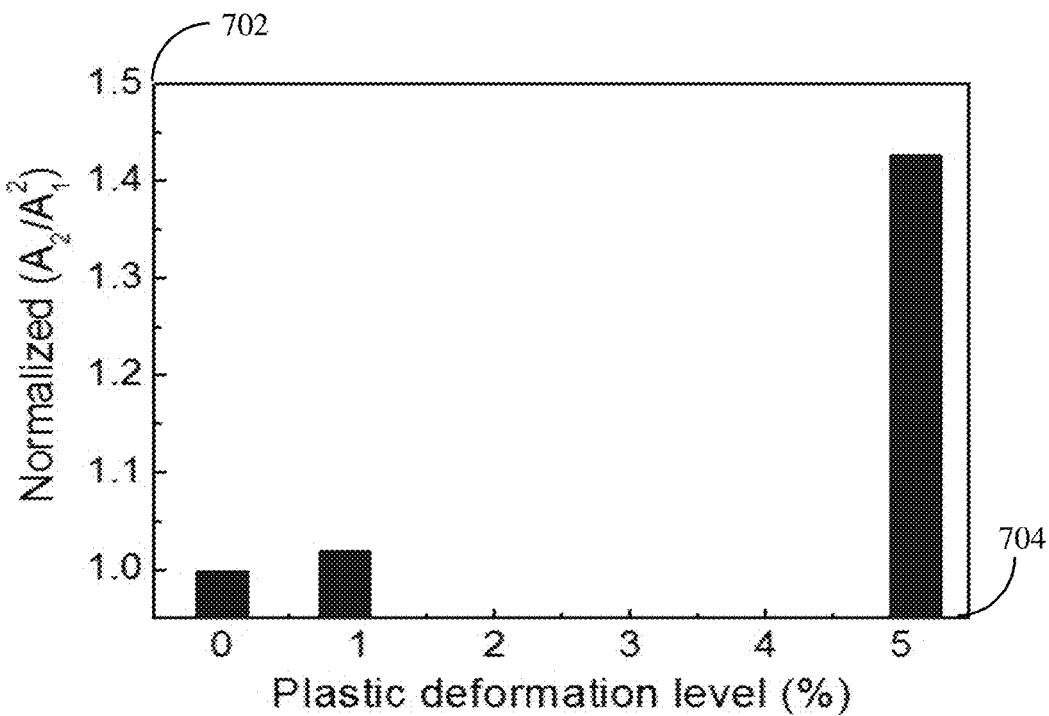
FIG. 7 depicts a bar graph of normalized parameters measured from three structural material samples with different levels of plastic deformation in accordance with a method for plastic deformation monitoring in accordance with the fourth variation of the present embodiments.

The $A_2/A_1^2$ parameters of the three titanium alloy plates 602 are compared in FIG. 7. FIG. 7 depicts a bar graph 700 of normalized parameters (the $A_2/A_1^2$ parameters were normalized based on that of the sample without plastic deformation) measured from the three titanium alloy plates 602 with different levels of plastic deformation in accordance a method for plastic deformation monitoring in accordance with the fourth variation of the present embodiments. An increase of the $A_2/A_1^2$ parameter (plotted along the y-axis 702) was observed with the increase of plastic deformation level (plotted along the x-axis 704). The result indicates the effectiveness in monitoring plastic deformation of the titanium alloy plate by analyzing nonlinear Rayleigh wave signal in accordance with systems and methods of the present embodiments, wherein the non-linear acoustic wave signal is generated by an acoustic transducer 504 formed by in-situ fabrication method on the titanium alloy plate 602.

Example 5

Figure 8:
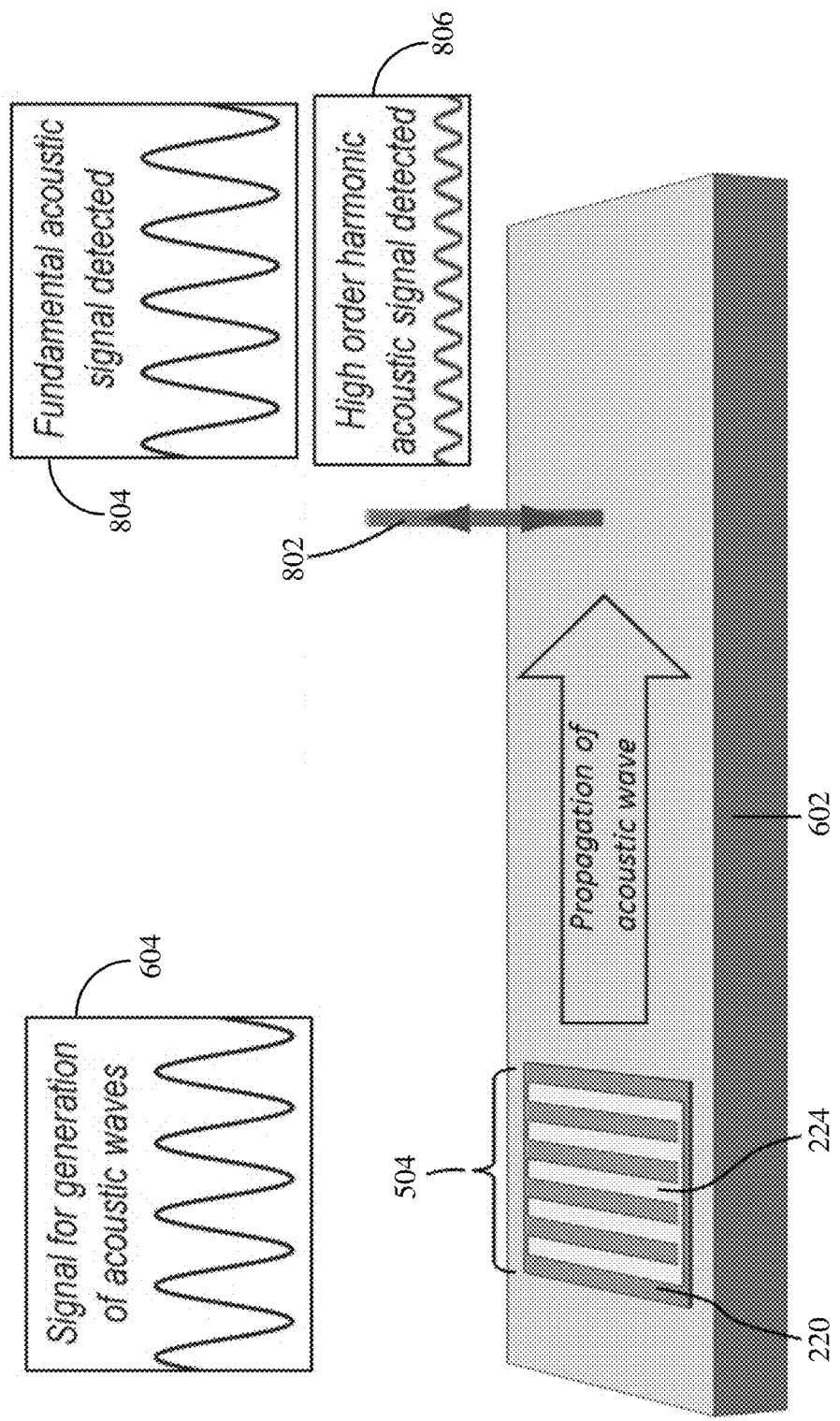
FIG. 8 depicts a perspective view of a system for plastic deformation monitoring in accordance with a fifth variation of the present embodiments.

Referring to FIG. 8, a perspective view 800 depicts a system for plastic deformation monitoring in accordance with a fifth variation (Example 5) of the present embodiments. The system for plastic deformation monitoring in accordance with the fifth variation is the same as the system depicted in the views 500, 600 except that a laser beam 802 is used to detect both the fundamental acoustic wave signals 804 and the $2^{nd}$ order harmonic acoustic wave signals 806.

In accordance with the method for testing the titanium alloy plates 602 described above, a Rayleigh wave signal is generated by the acoustic transducer 504 with the electric signal 604, formed on the titanium alloy plates 602 by in-situ fabrication and having a central frequency at 4.5 MHz. The out-of-plane displacement of the titanium alloy surface was measured by a laser scanning vibrometer incorporating the laser 802, and the displacement values at 4.5 MHz and 9.0 MHz were recorded as $U_1$ and $U_2$, respectively. The ratios of $U_2/U_1^2$ were then used as a parameter to evaluate plastic deformation of the titanium alloy plates 602. In addition, Rayleigh acoustic wave signals were generated on a similar titanium alloy plate by a discrete angle beam transducer at 4.5 MHz attached to the similar titanium alloy plate (i.e., not in-situ fabricated on the similar titanium alloy plate), the non-linear Rayleigh acoustic wave signals detected by the laser scanning vibrometer. The values of $U_2/U_1^2$ obtained from the two conditions were compared.

Figure 9:
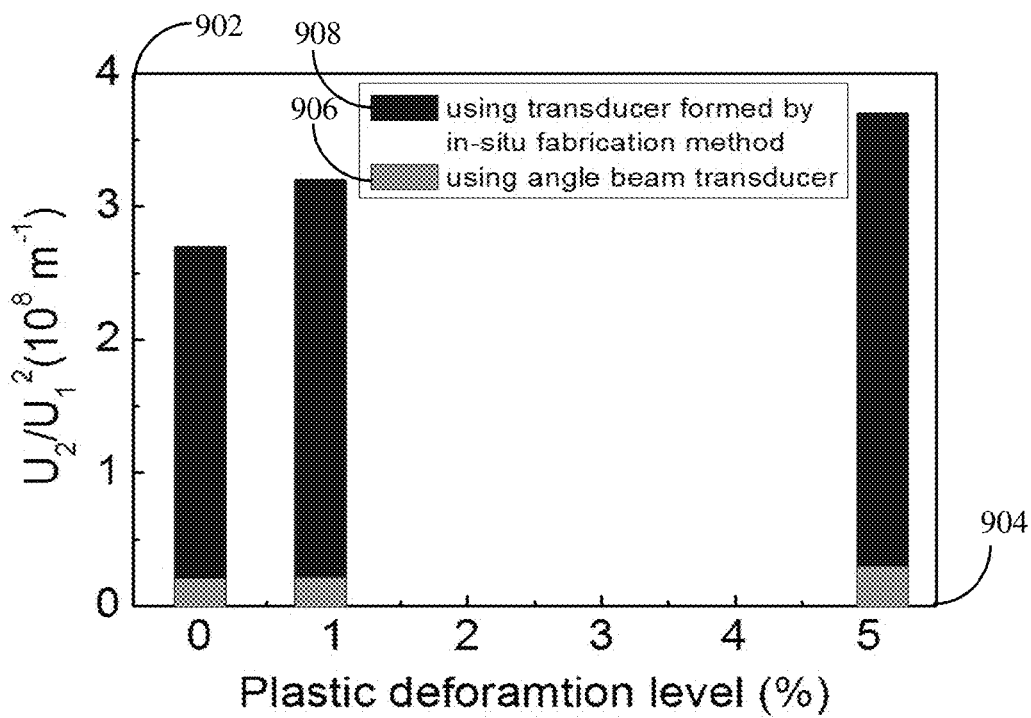
FIG. 9 depicts a bar graph of displacement parameters measured from three structural material samples with different levels of plastic deformation in accordance with the method for plastic deformation monitoring in accordance with the fifth variation of the present embodiments and in accordance with conventional methods.

Referring to FIG. 9, a bar graph 900 depicts the $U_2/U_1^2$ parameters measured from the three titanium alloy plates 602 with different levels of plastic deformation in accordance the method for plastic deformation monitoring in accordance with the fifth variation of the present embodiments and in accordance with conventional systems for plastic deformation monitoring. The increase in the $U_2/U_1^2$ parameters (plotted along the y-axis 902) was observed with the increase of plastic deformation level (plotted along the x-axis 904) for both the system 906 using an angle beam transducer (actuator) attached to the titanium alloy plate in a conventional manner and the system 908 using the transducer (actuator) 504 in-situ fabricated on the titanium alloy plate. The results indicate the effectiveness in monitoring plastic deformation of the titanium alloy plate by analyzing nonlinear Rayleigh wave signal in accordance with systems and methods of the present embodiments, wherein the acoustic wave signal is generated by the acoustic transducer 504 formed by in-situ fabrication method on the titanium alloy plate 602. As shown in the bar graph 900, the $U_2/U_1^2$ parameters measured from acoustic wave generated by the transducers 504 formed by the in-situ fabrication method showed much greater magnitude as compared to the similar titanium alloy plate having an angle beam transducer attached on, not in-situ fabricated on, the titanium alloy plate for acoustic wave generation. Accordingly, non-linear acoustic testing using acoustic transducers formed by in-situ fabrication method can enable significantly higher sensitivity in plastic deformation monitoring as compared to the existing method of using discrete transducers attached, not in-situ fabricated, to the structural material being monitored.

Example 6

Figure 10:
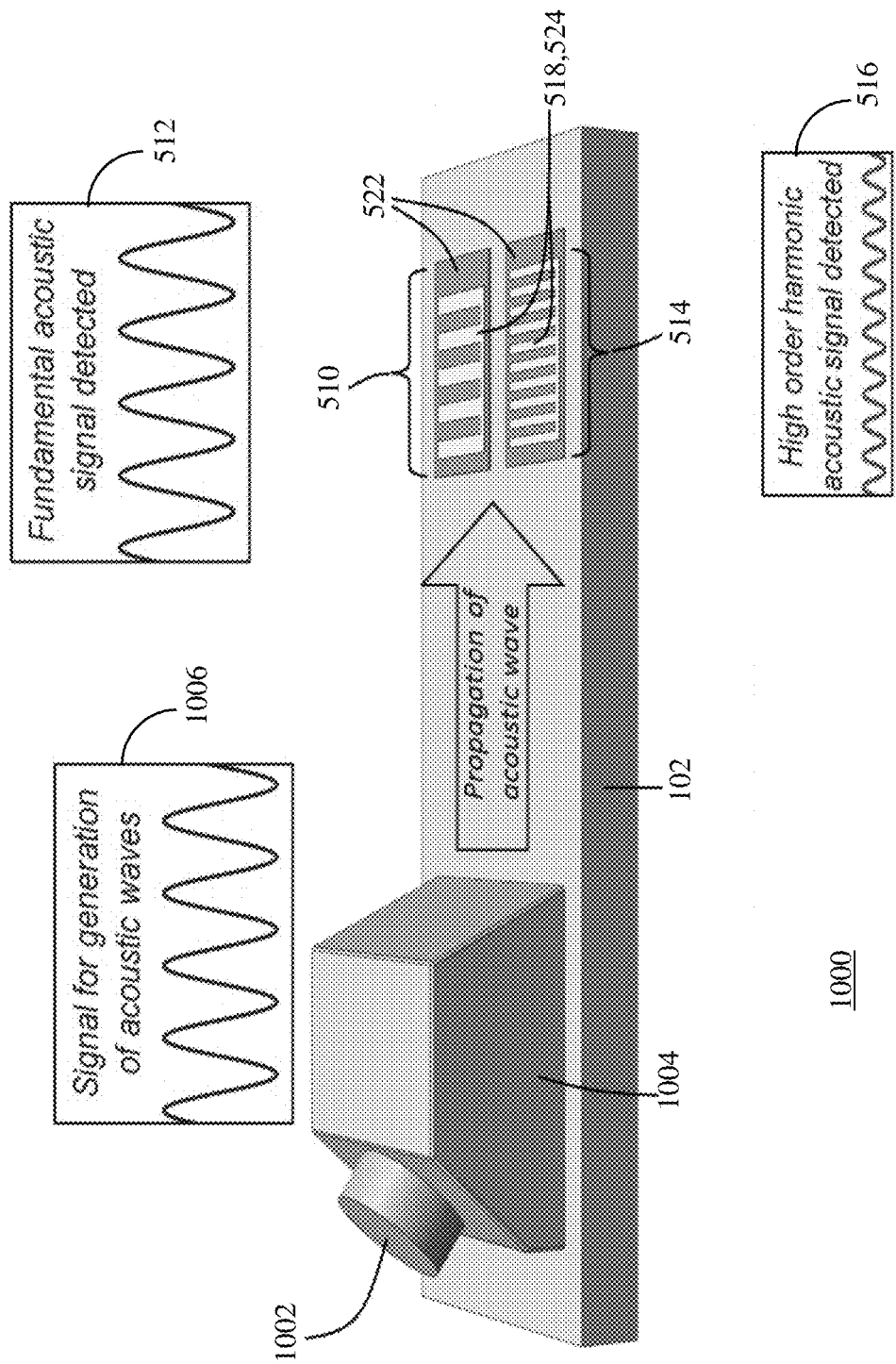
FIG. 10 depicts a perspective view of a system for plastic deformation monitoring in accordance with a sixth variation of the present embodiments.

FIG. 10 depicts a perspective view 1000 of a system for plastic deformation monitoring in accordance with a sixth variation of the present embodiments. The system for plastic deformation monitoring in accordance with the sixth variation is the same as the system depicted in the view 500 except that the acoustic waves are generated in the structural material 102 by an angle beam transducer 1002 with a wedge 1004 by the electric signal 1006, while the fundamental signals 512 and the $2^{nd}$ harmonic signals 516 are detected by two acoustic transducers (sensors) 510, 514, formed by the in-situ fabrication method on the structural material, respectively.

Example 7

When the structural material to be monitored is made of non-conductive materials or there is an insulation coating on the conductive structural material, a conductive layer can be coated on the structural material to serve as a bottom electrode below the piezoelectric material.

Example 8

The acoustic transducers in accordance with any of the present embodiments can be in-situ fabricated on a curved structural material for plastic deformation monitoring, thus enabling sensitive plastic deformation monitoring for curve-shaped structural material or complex-shaped structural material in accordance with systems and methods of the present embodiments.

Example 9

In accordance with present embodiments, a top protective layer may be deposited on the surface of the acoustic transducers in-situ fabricated on the structural material. Preferably, the top protective layer is an insulating material such as polyimide (PI) or poly(methyl methacrylate) (PMMA). The top protective layer protects the acoustic transducers from contamination and moisture to avoid electrical shorting and to improve operational stability and reliability.

Figure 11:
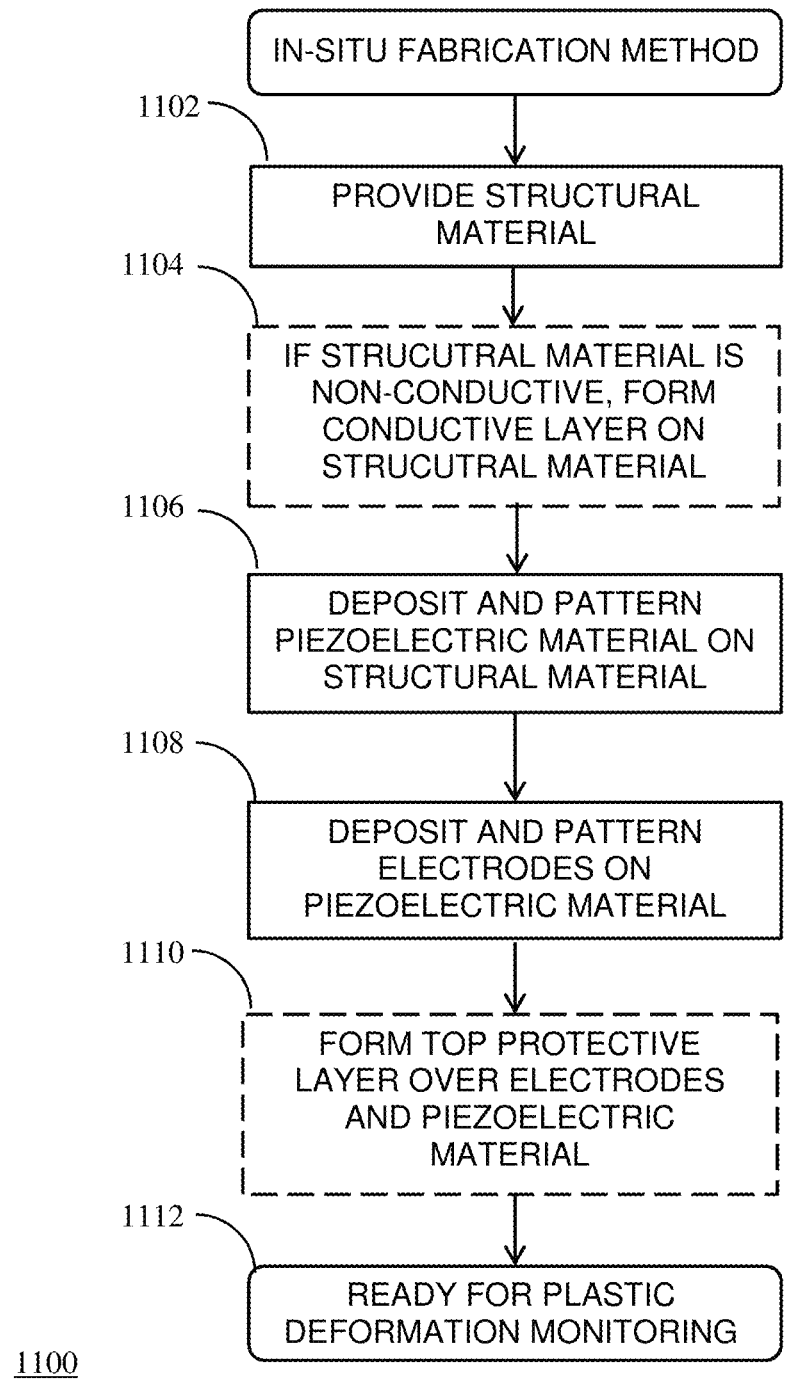
FIG. 11 depicts a flowchart of a method for in-situ fabrication of plastic deformation monitoring systems in accordance with the present embodiments.

Referring to FIG. 11, a flowchart 1100 depicts an exemplary method for in-situ fabrication of plastic deformation monitoring systems in accordance with the present embodiments. The in-situ fabrication method begins by providing 1102 a structural material for plastic deformation monitoring. If the structural material is non-conductive, a conductive layer may be deposited 1104 on the structural material to provide a bottom electrode for the acoustic transducers.

Next, the piezoelectric material for the acoustic transducers for generating and detecting the acoustic wave signals is deposited and patterned 1106 direction the structural material or directly on the conductive layer deposited in the optional step 1104. Then, the electrodes are deposited and patterned 1108 on the piezoelectric material. As described in the various embodiments, the electrodes could be comb electrodes with straight fingers, comb electrodes with curved or arced concentric fingers or concentrically circular electrodes. For the concentrically circular electrodes, an acoustic reflector 412, such as a metallic line pattern, can be fabricated on the structural material in an additional step not shown in the flowchart 1100 or as part of the step 1108.

Next, an optional step 1110 can form a protective layer over the electrodes as described above. The structural material with the in-situ fabricated acoustic transducers is then ready 1112 for plastic deformation in accordance with the methods and system of the present embodiments.

Figure 12:
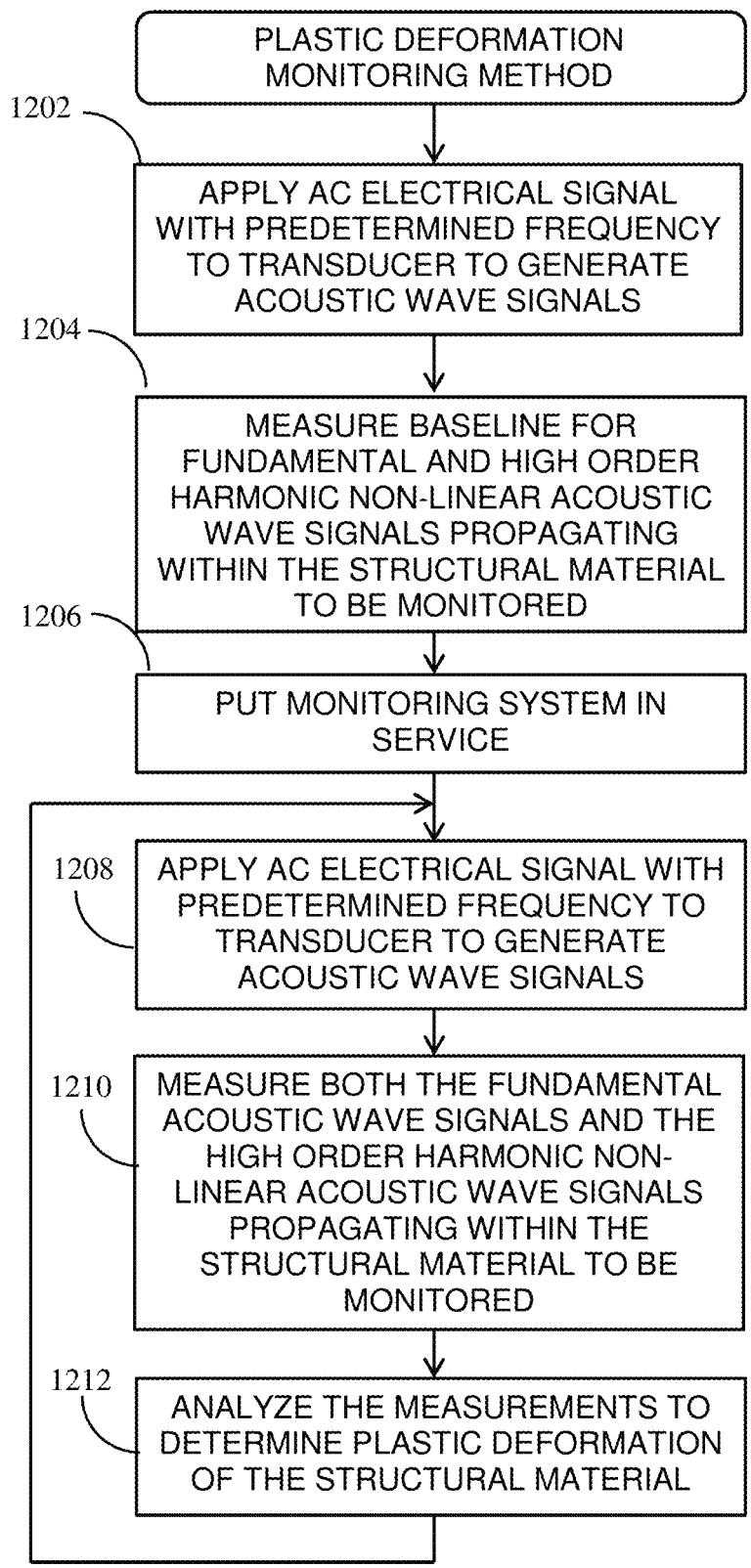
FIG. 12 depicts a flowchart of a method for plastic deformation monitoring in accordance with the present embodiments.

Referring to FIG. 12, a flowchart 1200 depicts an exemplary method for plastic deformation monitoring in accordance with the present embodiments. The plastic deformation monitoring begins by applying 1202 an AC electrical signal with a predetermine frequency to the acoustic wave actuators for generation of the acoustic wave signals within the structural material. The acoustic wave signals detected by the acoustic wave sensors/detectors are measured 1204 to determine baseline fundamental and high order harmonic acoustic wave signals propagated within the structural material being monitored.

Next, the structural materials with in-situ fabricated transducers are used in a service subject to a mechanical load, i.e., applied into service 1206 and the AC electrical signal is again applied 1208 to generate the acoustic wave signals having the predetermined frequency within the structural material. The fundamental and high order harmonic acoustic wave signals are again measured 1210 and the baseline and stress fundamental and high order harmonic acoustic wave signals are analyzed 1212 to determine the plastic deformation of the structural material.

In accordance with the systems and methods of the present embodiments that both the fundamental and the non-linear (e.g., the $2^{nd}$ harmonic) acoustic wave signals are generated and effectively detected by acoustic transducers for reliably comparing and determining the ratio of the non-linear acoustic wave signals over the fundamental signals. Comb-structured electrode patterns, circular electrode patterns or other electrode patterns are formed by in-situ fabrication method directly on the structural material and the gaps between the central lines of two adjacent electrode comb fingers correspond to the wavelength of the fundamental and high order harmonic acoustic wave propagated in the structural material.

More specifically, the periodicity of the electrode pattern of the transducers is determined by Equations (1) and (2) below:

$$d_1 = \frac{v}{f} \quad (1)$$

$$d_2 = \frac{v}{n*f} \quad (2)$$

where $d_1$ is the gap between the central lines of two adjacent electrode comb fingers for the transducers to generate and detect fundamental acoustic wave signals; $d_2$ is the gap between the central lines of two adjacent electrode comb fingers for the transducers to detect high order harmonic acoustic wave signal; is the velocity of the acoustic wave signals in the structural material; f is the predetermined frequency of the fundamental acoustic wave; and n is the order of harmonic acoustic wave signal (e.g., n=2 for the $2^{nd}$ harmonic in the embodiments)

In accordance with the present embodiments, it is not necessary to use large transducers or large distances between transducers for plastic deformation monitoring of a large structural material. Since mechanical stress is often concentrated at localized area(s) of a structural material, the miniaturized transducers in accordance with present embodiments can be advantageously deployed in the localized area(s) with further decreased distance for plastic deformation monitoring. The system and methods in accordance with the present embodiments offer significant advantages over conventional methods, devices and system to address technical demands in plastic deformation monitoring of structural materials.

Moreover, conventional plastic deformation monitoring using discrete transducers has additional limitations and many factors, such as fixing/positioning/aligning of wedge and amount/homogeneity of coupling gel, may affect the reliability and consistency of the results of high order harmonic acoustic signals. These limitations can be overcome by the systems and methods of monitoring plastic deformation of a structural material in accordance with present embodiments by analyzing non-linear acoustic wave signals generated and detected by an acoustic transducer formed by in-situ fabrication directly on the structural material.

Acoustic transducers formed by in-situ fabrication in accordance with the methods and systems of the present embodiments demonstrated significantly improved stability of performance as compared to conventional methods and systems. For example, in the case of plastic deformation monitoring using a conventional discrete transducer with a central frequency of 5 MHz, the performance of generating acoustic wave signals by the discrete transducer under typical driving condition (e.g., 100 cycle bursts of 150 V at 5 MHz) significantly deteriorates in a few minutes due to overheating. In contrast, during plastic deformation monitoring using the acoustic transducers formed by in-situ fabrication in accordance with the present embodiments, the transducers demonstrated consistent and stable performance under the same driving conditions for many hours.

Thus, it can be seen that the present embodiments provide methods and systems for monitoring plastic deformation of a structural material by analyzing the fundamental and the high order harmonic non-linear acoustic wave signals, wherein the non-linear acoustic wave signals are generated and detected by acoustic transducers formed by in-situ fabrication method directly on the structural material being monitored.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A system for monitoring plastic deformation of a structural material comprising:
   the structural material;
   an acoustic wave actuator configured to generate acoustic wave signals to be propagated within the structural material;
   an alternating current (AC) electric signal source coupleable to the acoustic wave actuator for driving the acoustic wave actuator to generate the acoustic wave signals at a predetermined frequency; and one or more acoustic wave sensors for detecting the non-linear acoustic wave signals propagated within the structural material in response to the acoustic wave signals generated by the acoustic wave actuator, the one or more acoustic wave sensors configured to detect both fundamental and high order harmonic acoustic wave signals at the predetermined frequency, wherein at least one of the acoustic wave actuator and/or the one or more acoustic wave sensors are in-situ fabricated on the structural material at a first location and/or one or more second locations, respectively.

2. The system in accordance with claim 1 wherein the acoustic wave actuator comprises a first acoustic transducer configured to generate the acoustic wave to be propagated within the structural material, the first acoustic transducer comprising:

piezoelectric material in-situ fabricated on the structural material at the first location; and electrodes having a plurality of fingers in-situ fabricated on the piezoelectric material, wherein a distance between central lines of adjacent ones of the plurality of fingers corresponds to a wavelength of the fundamental acoustic signals at the predetermined frequency.

3. The system in accordance with claim 2 wherein the piezoelectric material is fabricated on the structural material at the first location in a concentric circular pattern, and wherein the electrodes comprise a plurality of concentric circular patterned fingers in-situ fabricated on the piezoelectric material and configured to generate focused acoustic wave signals towards a center of the concentric circular patterned electrode.

4. The system in accordance with claim 3 further comprising an acoustic signal circular reflector concentric to and surrounding the plurality of concentric circular patterned fingers for focusing the acoustic wave signals towards the center of the plurality of concentric circular patterned fingers and for forming a resonance of the high order harmonic acoustic wave signals in the structural material within the acoustic signal circular reflector.

5. The system in accordance with claim 3 wherein the second location comprises a center of the concentric circular patterned electrode of the acoustic wave actuator, and wherein the one or more acoustic wave sensors comprise a circular acoustic transducer located at the second location and configured to detect the acoustic wave signals propagated within the structural material, the circular acoustic transducer comprising:

piezoelectric material in-situ fabricated on the structural material;

a first concentric circular patterned electrode in-situ fabricated on the piezoelectric material and configured to detect the fundamental acoustic signals of the non-linear acoustic wave signals at the predetermined frequency; and a second concentric circular patterned electrode in-situ fabricated on the piezoelectric material and configured to detect the high order harmonic acoustic signals of the predetermined frequency of the non-linear acoustic wave signals.

6. The system in accordance with claim 2 wherein the electrodes comprise one or more comb patterned electrodes and wherein each of the one or more comb patterned electrodes comprise a plurality of concentric arced fingers, and wherein an open area of each of the plurality of concentric arced fingers faces towards at least one of the one or more second locations for focusing the acoustic wave signals theretowards.

7. The system in accordance with claim 1, wherein the one or more acoustic wave sensors comprise one or more second acoustic transducers configured to detect the fundamental and high order harmonic wave signals of the non-linear acoustic wave signals propagated within the structural material, each of the one or more second acoustic transducers comprising:

piezoelectric material in-situ fabricated on the structural material at one of the one or more second locations; and one or more electrodes in-situ fabricated on the piezoelectric material.

8. The system in accordance with claim 7 wherein the one or more electrodes comprise:

a first electrode patterned to have a plurality of first fingers having gaps of a first width between the central lines of the adjacent first fingers configured to detect the fundamental acoustic signals of the non-linear acoustic wave signals at the predetermined frequency; and a second electrode patterned to have a plurality of second fingers having gaps of a second width between the central lines of the adjacent second fingers configured to detect the high order harmonic acoustic signals of the predetermined frequency of the non-linear acoustic wave signals.

9. The system in accordance with claim 8 wherein the first electrode is patterned on a first portion of the piezoelectric material at the one of the one or more second locations, and wherein the second electrode is patterned on a second portion of the piezoelectric material co-located with the first portion of the piezoelectric material at the one of the one or more second locations but not integrally formed with the first portion of the piezoelectric material.

10. The system in accordance with claim 1 wherein at least one of the one or more acoustic wave sensors comprises an angle beam transducer with a wedge assembled on the structural material.

11. The system in accordance with claim 1 wherein at least one of the one or more acoustic wave sensors comprises a laser for detecting both the fundamental and second harmonic acoustic wave signals at the predetermined frequency.

12. A method for monitoring plastic deformation of a structural material, the method comprising:

providing the structural material having an acoustic wave actuator at a first location on the structural material, the acoustic wave actuator configured to generate acoustic wave signals to be propagated within the structural material;

providing an alternating current (AC) electric signal source to the acoustic wave actuator for driving the acoustic wave actuator to generate the acoustic wave signals at a predetermined frequency;

detecting both fundamental and higher order harmonic acoustic signals at the predetermined frequency of non-linear acoustic wave signals propagated through the structural material; and analyzing both the fundamental and higher order harmonic acoustic signals of non-linear acoustic wave signals propagated through the structural material to determine plastic deformation of the structural material, wherein the step of providing the structural material having the acoustic wave actuator comprises:
fabricating in-situ the acoustic wave actuator at the first location on the structural material; and
providing the structural material having the acoustic wave actuator at the first location.

13. The method in accordance with claim 12 wherein analyzing the high order harmonic acoustic signals of the non-linear acoustic wave signals propagated through the structural material comprises analyzing second order harmonic acoustic signals of the non-linear acoustic wave signals.

14. The method in accordance with claim 12 wherein the step of providing the structural material further comprises:
fabricating in-situ an acoustic wave sensor at a second location on the structural material; and
providing the structural material having the acoustic wave sensor at the second location, the acoustic wave sensor detecting the non-linear acoustic wave signals generated by plastic deformation in a propagation path through the structural material, and
wherein the step of providing the electric signal source to the acoustic wave actuator comprises providing the electric signal source to the acoustic wave actuator for driving the acoustic wave actuator to generate the acoustic wave signals at the predetermined frequency and focused towards the acoustic wave sensor at the second location, and
wherein the step of detecting both the fundamental and second harmonic acoustic signals at the predetermined frequency comprises detecting both the fundamental and higher order harmonic acoustic signals of the non-linear acoustic wave signals propagated through the structural material by the acoustic wave sensor at the second location.

15. The method in accordance with claim 14 wherein the acoustic wave sensor comprises a laser, and wherein the step of detecting both the fundamental and higher order harmonic acoustic signals at the predetermined frequency comprises detecting both the fundamental and higher order harmonic acoustic signals at the predetermined frequency using the laser.

16. The method in accordance with claim 12 wherein fabricating in-situ the acoustic wave actuator and/or the acoustic wave sensor comprises:
directly depositing and patterning piezoelectric material on the structural material at the first location and the second location; and
directly depositing and patterning first electrodes on the piezoelectric material at the first location to fabricate the acoustic wave actuator; and
directly depositing and patterning second electrodes on the piezoelectric material at the second location to fabricate the acoustic wave sensor.

17. The method in accordance with claim 16 wherein the step of directly depositing and patterning the first electrodes comprises patterning the first electrodes on the piezoelectric material at the first location in a concentric circular electrode design to fabricate the acoustic wave actuator for focusing the acoustic wave signal towards the second location.

18. The method in accordance with claim 16 wherein the step of directly depositing and patterning the first electrodes comprises patterning the first electrodes on the piezoelectric material at the first location in an arced electrode design to fabricate the acoustic wave actuator for focusing the acoustic wave signal towards the second location.

19. The method in accordance with claim 16 wherein fabricating in-situ the acoustic wave actuator and the acoustic wave sensor further comprises depositing a protective layer of insulation material over the piezoelectric material, the first electrodes and the second electrodes.

20. The method in accordance with claim 12 further comprising before providing the electric signal source to the acoustic wave actuator for monitoring plastic deformation, the step of poling the acoustic wave actuator with an electric field.

* * * * *